Figures 1, 2:
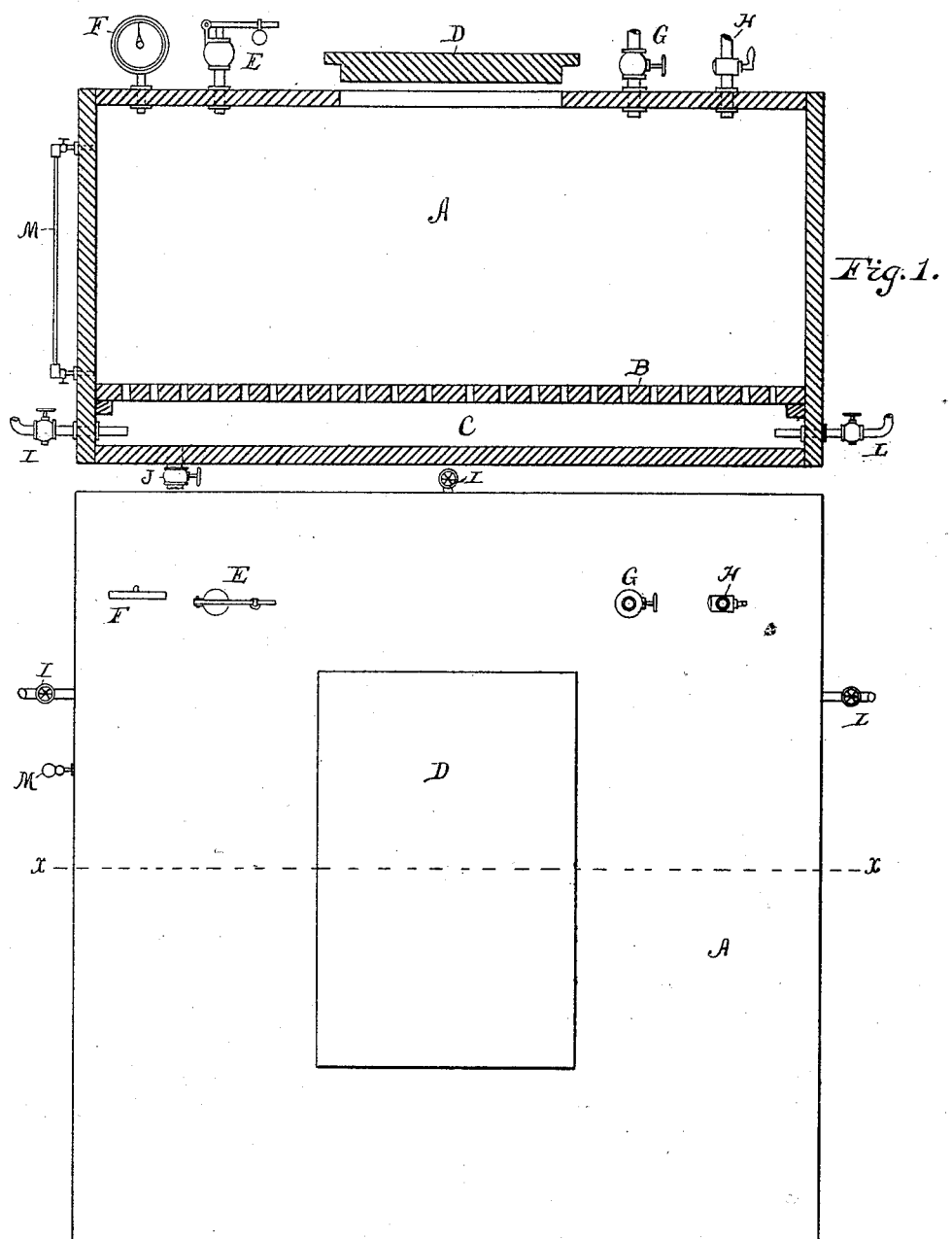

(No Model.)

W. MARR.
PROCESS OF TREATING VEGETABLE FIBROUS SUBSTANCES.

No. 342,448. Patented May 25, 1886.

WITNESSES:

INVENTOR
William Marr

UNITED STATES PATENT OFFICE.

WILLIAM MARR, OF PITTSBURG, PENNSYLVANIA.

PROCESS OF TREATING VEGETABLE FIBROUS SUBSTANCES.

SPECIFICATION forming part of Letters Patent No. 342,448, dated May 25, 1886.

Application filed November 19, 1885. Serial No. 183,293. (No model.)

*To all whom it may concern:*

Be it known that I, WILLIAM MARR, a citizen of the United States, residing in Pittsburg, Pennsylvania, have invented a new and useful Improvement in the Process of Treating Vegetable Fibrous Substances Preparatory to the Separation of the Fibers from the Woody Parts of the Same, of which invention the following is a specification.

The process heretofore pursued in the preparation of flax, hemp, jute, ramie, and other vegetable substances containing fibers suitable for use in the manufacture of cloth, cordage, thread, and other things has been the tedious and expensive process of retting—to wit, soaking the stalks in water and exposing them to the atmosphere for a long time, thus frequently injuring the fibers and always obtaining an inferior quality of fibers.

My invention, which consists of a substitute for the retting process, greatly reduces the time and lessens the cost of preparing the fibers. It also produces a far superior article of fibers, and utilizes materials that are now wasted in vast quantities.

In the annexed drawings, Figure 1 represents a vertical section on the line $x\ x$ in Fig. 2, and Fig. 2 a plan of apparatus which I use in carrying out my said process.

A represents a tank; B, a false perforated bottom; C, a space four inches in depth; D, a steam-tight cover; E, a safety-valve; F, a steam-gage; G, an inlet-pipe for heated air; H, an inlet-pipe for hot water; I I I, steam-inlet pipes; J, an outlet-pipe for liquids; L, an inlet-pipe for chemicals; M, a water-gage.

I place the fibrous stalks to be treated in the tank A on the false bottom B and close the cover D. I then admit through pipe H sufficient hot water to cover the stalks, adding thereto enough lime-water to render the liquid slightly alkaline. I then boil the stalks under steam-pressure from a half-hour to an hour, according to the nature and conditions of the materials treated; thus, flax-stalks I boil about a half-hour; hemp, jute, and ramie from three-quarters of an hour to an hour with a steam-pressure in any case preferably not exceeding twenty pounds. I then neutralize the lime with oxalic, muriatic, or nitric acid and continue the boiling for about five minutes, until the lime and acid have combined. I then run the liquid off and wash the stalks with boiling water, which is admitted through pipe H and drawn off through pipe J, until the lime-compound has been removed. My object in using the lime is to effectually loosen the cuticle that covers the fibers, and thus facilitate the after processes. I next cover the stalks with boiling water in which there has been dissolved from one pound to two pounds of borax per one hundred pounds of stalks, and boil under pressure, as before, from a half-hour to an hour, the quantity of borax and the time of boiling being regulated by the condition and nature of the materials treated. Thus, for flax I use about one pound of borax and boil from a half to three-quarters of an hour with a steam-pressure not exceeding twenty pounds. For jute, hemp, or ramie, I use about two pounds of borax and boil from three-quarters of an hour to an hour with a steam-pressure preferably not exceeding twenty pounds. I then run off the borax-liquid and again cover the stalks with boiling water in which there has been dissolved from one to two pounds of carbonate of potash or soda per one hundred pounds of stalks, and boil, as before, from a half-hour to two hours, according to the kind of materials treated. I then, through inlet L, introduce sufficient muriatic acid to neutralize the alkaline carbonate, in which process the escaping carbonic acid tends to separate the fibers. I next introduce through inlet L a small quantity of diluted sulphuric acid, sufficient to release the chlorine, which has the effect of partly bleaching the fibers and at the same time assisting the separation of the fibers. I then run off the liquor and wash the fibers with boiling water until all trace of chemicals is removed. I then force into the tank by means of a pump or blower a current of air heated to about 120° Fahrenheit, by which means the stalks are dried, the woody portions thereof being rendered more friable and capable of easy separation from the fibers, which separation is afterward effected by the ordinary methods of breaking and heckling.

It is to be noted that the object of boiling under steam-pressure is to avoid agitating the stalks and obtain unbroken fibers. The process must not be carried so far as to pulp the wood.

I prefer that the form of the tank shall be, as shown, in the proportions of twelve feet in length, seven feet in depth, and six feet in width, and that the tank shall be made of iron coated with mineral paint. The tank, however, may have any other form or size, and other materials may be used in its construction.

I claim—

In the preparation of flax, hemp, jute, ramie, and other vegetable fibrous substances preparatory to the separation of the fibers from the woody portions of the substance treated, the process which consists in the following steps, to wit: first, boiling the fibrous substances in lime-water in a close tank or vessel under steam-pressure; second, neutralizing the lime with acid and washing the fibrous substances clean with hot water; third, boiling the fibrous substances in borax-water, and then running off this water; fourth, boiling the fibrous substances in water containing carbonate of potash or soda; fifth, introducing muriatic acid to neutralize the alkaline carbonate; sixth, introducing diluted sulphuric acid sufficient to release chlorine; seventh, washing the fibrous substances clean with hot water; and, eighth, drying the fibrous substances by forcing a current of hot air through them, substantially as set forth.

WILLIAM MARR.

Witnesses:
J. E. SHAW,
R. DAVIS.